May 19, 1959 R. M. KELLY 2,886,980
DIFFERENTIAL
Filed Jan. 16, 1958 2 Sheets-Sheet 1
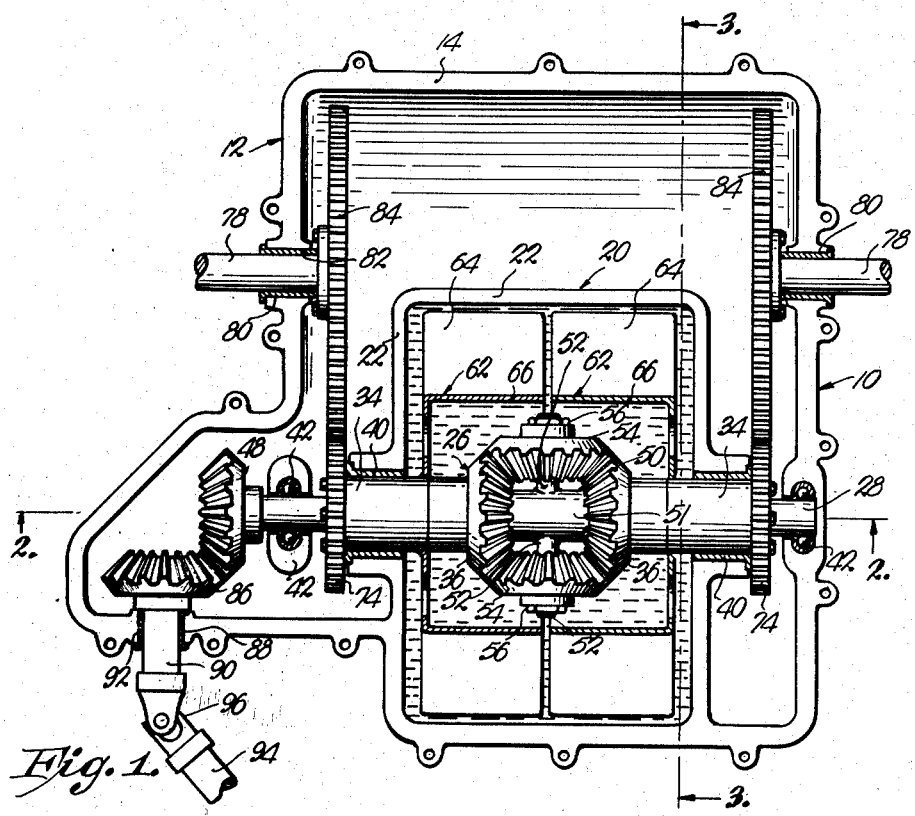
Fig. 1.
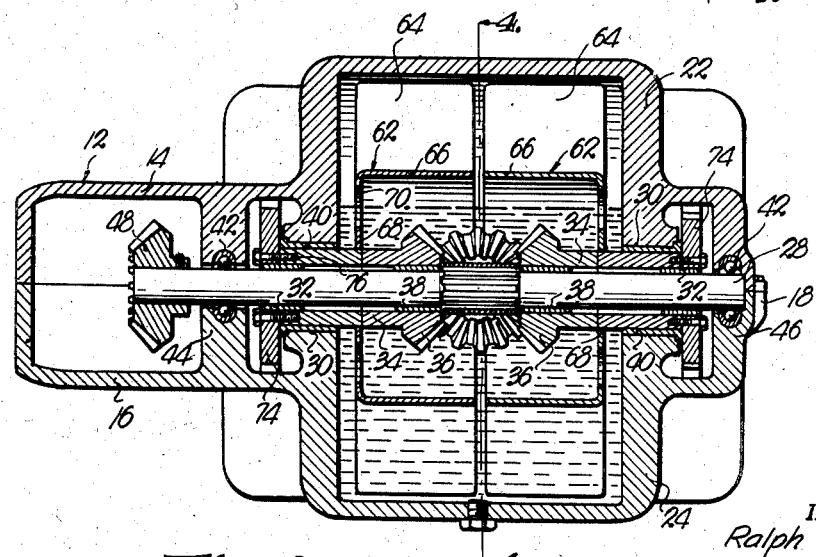
Fig. 2.
INVENTOR.
Ralph M. Kelly
BY
ATTORNEY.

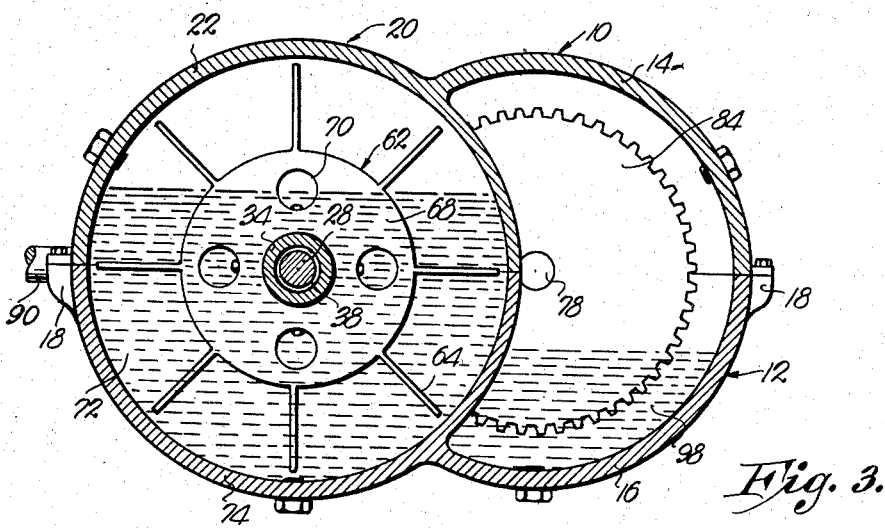
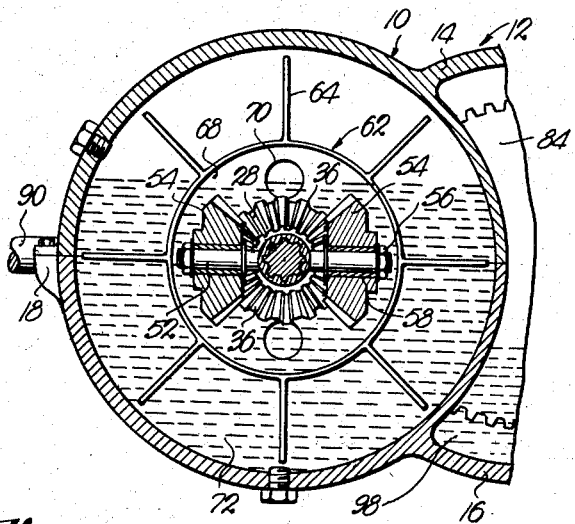
Fig. 3.
Fig. 4.
INVENTOR.
Ralph M. Kelly

United States Patent Office 2,886,980
Patented May 19, 1959

2,886,980

DIFFERENTIAL

Ralph M. Kelly, Kansas City, Mo.

Application January 16, 1958, Serial No. 709,283

7 Claims. (Cl. 74—711)

This invention relates to differential gearing and more particularly, to an improved differential gear train for transmitting and distributing torque to the traction wheels of a vehicle irrespective of the condition of the road surface upon which the wheels are running.

It is, of course, well known that differentials of various types have been used and which embody an epicyclic gear train which distributes torque from the drive shaft of the power plant of the vehicle to driving wheels of the same, while permitting relative rotation of the traction wheels with respect to each other during the time the wheels are operably connected to the power plant by suitable transmission mechanism. Differentials of the type described above permit one traction wheel of the vehicle to turn at a faster rate than the other opposed wheel when the vehicle is going around a corner and, under ordinary road conditions, differentials utilizing the epicyclic gear train principle operate very satisfactorily and permit the power to be transmitted to the wheels despite the fact that one may be turning faster than the other when the vehicle goes around a corner.

Because of the fact that the differential permits the wheels to rotate relative to each other during the time that power is applied to the wheels, it can be appreciated that if one of the wheels moves onto a road surface which is slick because of mud, ice or snow, the coefficient of friction between the one wheel and the road becomes so low that the wheel is permitted to rotate while the other wheel stands still, due to the inherent gearing characteristics of the epicyclic gear train referred to above. The tendency of the wheel to spin is increased because of the fact that the same is rotated faster at the same engine r.p.m. than when both of the traction wheels are driven equally by the differential gear train.

Many modified differentials of the described type have heretofore been proposed and employed to counteract this free spinning tendency of the gear train but have not been entirely satisfactory because of the increased cost of the assembly and complicated nature of the mechanisms, making them much more difficult to repair and liable to breakdown. The most widely used of these prior devices have included a series of hydraulically operated clutches which automatically engage when one of the wheels begins to spin at a greater rate than normal and which can be sensed by the mechanism.

It is, therefore, the most important object of this invention to provide a differential wherein a conventional epicyclic gear train is employed but which has simple, inexpensive and trouble-free mechanism connected to certain of the gears of the train which operates to limit excessive relative rotation of the vehicle axle shafts when one of the traction wheels begins spinning on a slick surface of the roadbed.

Also an important object of the invention is to provide a differential as described wherein the gear train is housed within a sealed casing adapted to receive a fluid, and wherein there is provided means connected to a pair of opposed bevel gears operably coupled with respective axle shafts and adapted for moving the fluid in a circular path of travel within the casing during operation of the differential, whereby the circulating fluid reacts with the means to substantially prevent excessive relative rotation of the axle shafts while power is transmitted to the differential.

An additional important aim of the present invention is to provide a differential wherein the means for moving the fluid in a circular path of travel within the casing includes a pair of cup-shaped elements, each secured to a respective bevel gear for rotation therewith and having radially extending, proximally disposed vanes on the outer arcuate surface thereof whereby the circulating fluid reacting on the vanes tends to prevent relative rotation of the elements and thereby the bevel gears during operation of the differential.

A further important aim of this invention is to provide a differential wherein the gear train is positioned with the power shaft thereof located in parallel, spaced relationship to opposed axle shafts of the differential, to the end that the bevel gears rotatably mounted on the power shaft may be rotated at a different rate than the axle shafts through utilization of suitable gearing.

Other important objects of this invention relate to the provision of a differential wherein the components are enclosed in separate, individually sealed housings so that maximum efficiency is obtained from the impeller vanes reacting on the fluid contained within one of the housings; to the provision of a differential which is adapted to be utilized in both front engine and rear engine cars with equal facility by virtue of the disposition of the power input shaft of the differential; to the provision of a differential having the characteristics described without the necessity of utilizing hydraulic clutches, governors and other similar mechanisms which would materially increase the cost of the unit; to the provision of a differential wherein the epicyclic gear train is disposed on an elongated, one piece power shaft whereby stress on the unit is more equally distributed than in heretofore suggested units of this type; to the provision of a differential which may be easily assembled and disassembled because of the way in which the units are mounted in cooperative relationship; and to other details and further objects which will become obvious as the following specification progresses.

In the drawings:

Figure 1 is a bottom view of a differential embodying the concepts of the instant invention and having the lower section of the housing removed, and looking upwardly into the unit;

Fig. 2 is a vertical, cross-sectional view taken substantially on the line 2—2 of Fig. 1;

Fig. 3 is a vertical, cross-sectional view taken on the line 3—3 of Fig. 1; and

Fig. 4 is a fragmentary, vertical, cross-sectional view taken on the line 4—4 of Fig. 2.

A differential broadly designated by the numeral 10 includes a sectional casing 12 having a pair of opposed outer shells 14 and 16 suitably secured together by fasteners 18, and a sectional, cylindrical housing 20 provided with an upper, semicylindrical segment 22 integral with shell 14 and a lower, semicylindrical segment 24 integral with shell 16. As clearly shown in Fig. 1, housing 20 is somewhat narrower than the width of casing 12 and is adapted to receive an epicyclic gear train generally designated by the numeral 26.

Gear train 26 includes an elongated, one piece power shaft 28 extending through axially aligned openings 30 in housing 20 and journalled within bearings 32, in turn maintained in correct axial alignment by opposed, elongated, cylindrical sleeves 34 rotatably positioned over power shaft 28 and disposed coaxially therewith. A pair of opposed, coaxial, bevel gears 36 integral with the innermost ends of sleeves 34 and facing each other are maintained in spaced relationship from power shaft 28 by corresponding bearings 38 positioned adjacent the innermost parts of bevel gears 36.

Bearings 40 within respective openings 30 in housing 20 rotatably support corresponding sleeves 34 and thereby maintain the latter in axial alignment, while the outermost ends of shaft 28 are journalled within suitable thrust ball bearings 42 located within mounting means 44 and 46 forming a part of casing 12, it being noted that the end of power shaft 28 adjacent mounting means 44 extends therebeyond and has a bevel pinion 48 suitably secured to the outer portion thereof in axial alignment with shaft 28.

A cross unit 50 is mounted on power shaft 28 and includes a tubular main body 51 slipped over and surrounding power shaft 28 and splined on the latter substantially intermediate the ends of the same midway between opposed end walls of housing 20, as well as a pair of oppositely extending thrust shafts 52 suitably secured to the outermost surface of body 51 by welding or the like and located midway between the ends of the same. As clearly shown in Fig. 1, thrust shafts 52 are relatively short and extend outwardly from body 51 and thereby power shaft 28 at substantially right angles to the same. A pair of opposed, coaxial bevel pinions 54 are rotatably mounted on opposed ends of thrust shafts 52 in coaxial relationship to the latter and are interposed between and intermeshed with opposed side or bevel gears 36 forming a part of sleeves 34. Nuts 56 threaded onto the outermost ends of thrust shafts 52 maintain pinions 54 in correct operable engagement with bevel gears 36 and limit reciprocable movement of the same, while bearings 58 interposed between corresponding pinions 54 and thrust shafts 52 operate to reduce friction between the interengaged parts.

The outermost ends of body 51 engage opposed faces of bevel gears 36 and thereby serve to limit reciprocable movement of sleeves 34 and bevel gears 36 longitudinally along power shaft 28 toward thrust shafts 52 and bevel pinions 54 and thus, prevent binding of the gears.

A substantially cup-shaped element 62 is secured to each of the sleeves 34 for rotation therewith and, as clearly shown by Figs. 1 and 2, elements 62 are disposed axially with respect to corresponding sleeves 34 as well as with power shaft 28. A series of radially extending, circumferentially spaced impeller vanes 64 are secured to and project outwardly from the outermost cylindrical surfaces 66 of elements 62 and terminate in slightly spaced relationship to the innermost surface of husing 20. The circular bottom walls 68 of elements 62 are provided with a series of radially disposed openings 70 which permit fluid 72 contained within housing 20 to pass to the components disposed within elements 62 for lubrication purposes. It may be noted from Fig. 2 that impeller vanes 64 on corresponding elements 62 are positioned so that planes through the same pass through the axis of power shaft 28 and furthermore, are disposed in proximal relationship so that it is difficult for fluid 72 to pass through the space between vanes 64 on respective elements 62.

Spur gears 74 are connected to opposed, outermost ends of sleeves 34 by threaded fasteners 76 passing through gears 74 into sleeves 34 and, as shown in Fig. 2, spur gears 74 are positioned axially with respect to power shaft 28 and are rotatably disposed over bearings 32 outside of and adjacent opposed end walls of housing 20. A pair of relatively rotatable axle shafts 78 are rotatably mounted in opposed openings 80 in the side walls of casing 12 and are journalled within suitable corresponding bearings 82, it being noted that shafts 78 are positioned with their axes in alignment, and parallel with and spaced from the axis of power shaft 28. Relatively large spur gears 84 are secured to the innermost ends of corresponding axle shafts 78 within casing 12 and are suitably intermeshed with spur gears 74 for rotation thereby.

Means for driving power shaft 28 includes an input shaft 90 rotatably mounted within bearing 88 positioned in an opening 92 in casing 12 and a bevel pinion 86 secured to the outermost end of shaft 90 and operably intermeshed with pinion 48 for driving the latter. A shaft 94 operably coupled with pinion 86 through a universal joint 96 is connected to the power plant of a vehicle or the like and provides the necessary torque for operating differential 10. In order to provide lubrication for gears 74 and 84 and pinions 48 and 86, casing 12 is partially filled with a suitable lubricant 98 which may be the same or different from the fluid 72 within housing 20.

In operation, power transmitted from the power plant through shafts 94 and 92 to pinion 86 is directed to power shaft 28 through pinion 48 to thereby turn the former at a predetermined rate, it being apparent that in the arrangement illustrated in the drawings, shaft 28 will be turned at the rate of rotation of shaft 94. Power shaft 28 rotates within sleeves 34 and respective gears 36 and thereby turns thrust shaft 52 therewith. If the traction wheels of the vehicle operably coupled with axle shafts 78 are running on a surface which does not permit the same to slip, nor is the vehicle going around a corner, it can be appreciated that pinions 54 and bevel gears 36 do not rotate relative to each other and the force is transmitted from thrust shaft 52 directly to sleeves 34 through bevel gears 36 to thereby rotate spur gears 74. Inasmuch as spur gears 74 are operably intermeshed with larger gears 84, it can be seen that axle shafts 78 and thereby the traction wheels of the vehicle are driven at a relatively lower rate than sleeves 34 and bevel gears 36.

However, if the vehicle turns a corner and it is necessary for one of the traction wheels to turn at a faster rate than the other wheel, it can be appreciated that pinions 54 are caused to rotate about the axis of thrust shaft 52 to thereby permit bevel gears 36 to rotate at different rates. When the road upon which the traction wheels of the vehicle are running presents sufficient friction to the wheels, the same amount of power is transmitted to axle shafts 78 even though one of the wheels is turning at a slower rate than the other and thus, torque is distributed equally to the wheels.

A different situation is presented when the traction wheels on the ground encounter less resistance, such as when the road is muddy, icy or covered with snow and in these circumstances, if one of the wheels is positioned on a slick surface while the other retains sufficient frictional engagement with such ground, it can be appreciated that because of the epicyclic gear train provided within differential 10, the wheel on the slick surface will spin while the traction wheel disposed on the friction surface does not rotate at all. The impeller vanes 64 on elements 62 move fluid 72 within housing 20 in a circular path of travel during rotation of power shaft 28 and thereby sleeves 34 and thus, circulating fluid 72 within housing 20 reacting on impeller vanes 64 tends to prevent relative rotation of elements 62 and thereby bevel gears 36.

When one of the traction wheels of the vehicle tends to spin on a slick surface, circulating fluid 72 within housing 20 acting on impeller vanes 64 serves to restrict relative rotation of sleeves 34 and thereby spur gears 74 and thus, power is transmitted to both of the axle shafts 78 despite the fact that one of the wheels is positioned on a substantially frictionless surface.

Because of the fluid coupling of elements 62 it can be appreciated that the mechanism described above does not interfere with normal operation of differential 10 since, when traveling around even the most angular curve, the relative rotation of pinions 54 with respect to bevel gears 36 never exceeds approximately fifteen r.p.m.'s and thus, the force of circulating fluid 72 on impeller vanes 64 is not sufficient to prevent this degree of relative rotation of axle shafts 78. In fact, the force imparted to impeller vanes 64 and tending to prevent relative rotation thereof serves to maintain the force on both of the traction wheels as the same go around a corner and thus prevent skidding, even though the surface is slightly slick as when roads are wet or the like.

In lieu of the gear arrangement shown for driving power shaft 28, if desired, the drive shaft of the power plant may be connected directly to the outermost end of power shaft 28 by any suitable means and preferably by utilization of a universal joint. This arrangement of parts is particularly advantageous for driving differential 10 from the power plant disposed in the rear part of a vehicle and the only change necessary would be elimination of pinions 48 and 86 and changing of casing 12 to receive the drive shaft of the vehicle in any suitable manner, preferably in as close axial alignment with power shaft 28 as possible.

Another feature of the present invention is the fact that the gear train 26 is rotated substantially at the speed of drive shaft 94 and thus, when one of the traction wheels tends to slip on a slick surface, the mechanical advantage gained by the gear ratio between spur gears 74 and 84 acts as a multiplier of the force produced by circulating fluid 72 in housing 20 acting upon impeller vanes 64 and therefore, the necessary torque is directed to the wheel on the friction surface and a smooth start of the vehicle is assured, even though one of the traction wheels is disposed on a substantially frictionless roadbed. The present differential is also utilizable without the provision of impeller vanes 64 and it can be seen that many advantages arise from the provision of sleeves 34 connected to bevel gears 36 in parallel spaced relaionship to axle shafts 78, thereby permitting gear train 26 to be rotated at the speed of drive shaft 94, while axle shafts 78 are driven at a reduced speed by virtue of gears 84 being of larger diameter than spur gears 74.

An important feature of differential 10 is the fact that when the vehicle is started from a complete stop and one of the wheels is disposed on a substantially frictionless surface so that the wheel has a tendency to spin with respect to the other wheel, fluid 72 within housing 20 is moved in a circular path of travel by the impeller vanes 64 associated with the spinning wheel and thus force from the fluid being circulated within housing 20 is transmitted to the opposed series of impeller vanes 64 to thereby drive the opposite wheel of the vehicle. It can be seen that force is transmitted to both wheels of the vehicle regardless of the condition of the roadbed upon which the wheels are disposed and the tendency of one wheel to spin at a much higher rate than the other on certain surfaces is virtually eliminated.

Other modifications in the present invention may be made without departing from the spirit thereof and it is intended to be limited only by the scope of the appended claims.

Having thus described the invention what is claimed as new and desired to be secured by Letters Patent is:

1. In a differential provided with a gear train including a pair of opposed, coaxial, relatively rotatable bevel gears spaced from and each operably coupled to a respective axle shaft and a pair of opposed, coaxial, relatively rotatable bevel pinions interposed between and intermeshing with said bevel gears and operably coupled with a power shaft disposed at right angles to the axes of said pinions, the combination with said gear train of a housing enclosing said bevel gears and the pinions and adapted to contain a quantity of fluid; an element secured to each of said bevel gears for rotation therewith; and a series of members disposed radially on each of said elements and positioned in proximal relationship for moving the fluid in a circular path of travel during rotation of the members whereby the circulating fluid tends to prevent relative rotation of the members and thereby the bevel gears during operation of the differential.

2. In a differential provided with a gear train including a pair of opposed, coaxial, relatively rotatable bevel gears spaced from and each operably coupled to a respective axle shaft and a pair of opposed, coaxial, relatively rotatable bevel pinions interposed between and intermeshing with said bevel gears and operably coupled with a power shaft disposed at right angles to the axes of said pinions, the combination with said gear train of a housing enclosing said bevel gears and the pinions and adapted to contain a quantity of fluid; an element secured to each of said bevel gears for rotation therewith; and a series of radially extending, circumferentially spaced vanes rigidly secured to each element, said vanes lying in planes passing through said axes of the bevel gears and said series being disposed in proximal relationship for moving the fluid in a circular path of travel during rotation of the vanes whereby the circulating fluid tends to prevent relative rotation of the vanes and thereby the bevel gears during operation of the differential.

3. The invention as set forth in claim 2 wherein said elements are substantially cup-shaped and positioned with their axes in alignment with the axes of said bevel gears, said vanes being rigidly secured to the outermost surface of the elements and projecting outwardly therefrom.

4. The invention as set forth in claim 3 wherein the inner surface of the housing is substantially circular in transverse cross-section and disposed in slightly spaced relationship to the outermost ends of said vanes.

5. The invention as set forth in claim 4 wherein said cup-shaped elements are provided with a plurality of perforations in the normally closed ends thereof for permitting fluid to flow onto said bevel gears and the pinions.

6. In a differential provided with a gear train including a pair of opposed, coaxial, relatively rotatable bevel gears and a pair of opposed, coaxial, relatively rotatable bevel pinions interposed between and intermeshing with said bevel gears and operably coupled with a power shaft disposed at right angles to the axes of said pinions, the combination with said gear train of a housing enclosing said bevel gears and the pinions and adapted to contain a quantity of fluid; an element secured to each of said bevel gears for rotation therewith; a series of members disposed radially on each of said elements and positioned in proximal relationship for moving the fluid in a circular path of travel during rotation of the members whereby the circulating fluid tends to prevent relative rotation of the members and thereby the bevel gears during operation of the differential; a pair of relatively rotatable axle shafts carried by said housing in parallel, spaced relationship to the axes of said bevel gears; and gear means operably coupling each of said bevel gears with a respective axle shaft.

7. In a differential provided with a gear train within a casing and including a pair of opposed, coaxial, relatively rotatable bevel gears spaced from and each operably coupled to a respective axle shaft and a pair of opposed, coaxial, relatively rotatable bevel pinions interposed between and intermeshing with said bevel gears and operably coupled with a power shaft disposed at right angles to the axes of said pinions, the combination with said gear train of a housing disposed within said casing, sealed therefrom, enclosing said bevel gears and the pinions and adapted to contain a quantity of fluid; an element secured to each of said bevel gears for rotation therewith; and a series of members disposed radially on each of said elements and positioned in proximal relationship for moving the fluid in a circular path of travel during rotation of the members whereby the circulating fluid tends to prevent relative rotation of the members and thereby the bevel gears during operation of the differential.

References Cited in the file of this patent

UNITED STATES PATENTS

| | | |
|---|---|---|
| 1,686,431 | Wyman | Oct. 2, 1928 |
| 2,242,605 | Casner | May 20, 1941 |
| 2,746,320 | Algie | May 22, 1956 |
| 2,775,141 | Ronning | Dec. 25, 1956 |